United States Patent [19]
Underwood et al.

[11] Patent Number: 5,504,655
[45] Date of Patent: Apr. 2, 1996

[54] ELECTRIC VEHICLE POWER DISTRIBUTION MODULE

[75] Inventors: Thomas C. Underwood, Laurel; James H. DeOms, Glen Arm; Todd M. Zaranski, Baltimore; Brian H. Smith, Arnold, all of Md.

[73] Assignee: Westinghouse Electric Corp., Pittsburgh, Pa.

[21] Appl. No.: 258,157

[22] Filed: Jun. 10, 1994

[51] Int. Cl.$^6$ ...................................................... H05K 7/20
[52] U.S. Cl. .......................... 361/707; 200/50 A; 361/626; 361/642; 439/911
[58] Field of Search .................................. 165/185, 80.3; 439/911; 123/41.31, 480, 195 E; 361/601, 622, 626, 641, 642, 657, 658, 690, 704, 707, 709, 710, 816, 818, 690; 200/50 A, 50 B; 307/10.1

[56] References Cited

U.S. PATENT DOCUMENTS

| | | | |
|---|---|---|---|
| 3,141,713 | 7/1964 | Kaufman | 312/223.1 |
| 3,147,056 | 9/1964 | Mendelson | 439/63 |
| 3,857,044 | 12/1974 | Papoi | 307/10.1 |
| 4,557,225 | 12/1985 | Sagues | 123/41.31 |
| 4,599,680 | 7/1986 | Gibson | 361/386 |
| 4,818,237 | 4/1989 | Weber | 439/693 |

*Primary Examiner*—Gerald P. Tolin
*Attorney, Agent, or Firm*—C. O. Edwards

[57] ABSTRACT

An electric vehicle power distribution module including a chassis containing electric power distribution components. A battery connector is disposed on the chassis for electrically connecting the power distribution components to a battery. A safety cover is secured to the chassis and includes an aperature in a side wall for receiving an electric cable from the battery to be selectively engaged with the battery connector. The aperture is positioned with respect to the battery connector so as to preclude removal of the safety cover from the chassis without disengagement of the electric cable from the battery connector.

18 Claims, 8 Drawing Sheets

ELECTRIC VEHICLE POWER DISTRIBUTION MODULE

RELATED APPLICATIONS

The following identified U.S. patent applications are filed on the same date as the instant application and are relied upon and incorporated by reference in this application.

U.S. patent application entitled "Flat Topping Concept" bearing attorney docket No. 58,295, and filed on the same date herewith;

U.S. patent application entitled "Electric Induction Motor And Related Method Of Cooling" bearing attorney docket No. 58,332, and filed on the same date herewith;

U.S. patent application entitled "Automotive 12 Volt System For Electric Vehicles" bearing attorney docket No. 58,333, and filed on the same date herewith;

U.S. patent application entitled "Direct Cooled Switching Module For Electric Vehicle Propulsion System" bearing attorney docket No. 58,334, and filed on the same date herewith;

U.S. patent application entitled "Electric Vehicle Propulsion System" bearing attorney docket No. 58,335, and filed on the same date herewith;

U.S. patent application entitled "Speed Control and Bootstrap Technique For High Voltage Motor Control" bearing attorney docket No. 58,336, and filed on the same date herewith;

U.S. patent application entitled "Vector Control Board For An Electric Vehicle Propulsion System Motor Controller" bearing attorney docket No. 58,337, and filed on the same date herewith;

U.S. patent application entitled "Digital Pulse Width Modulator With Integrated Test And Control" bearing attorney docket No. 58,338, and filed on the same date herewith;

U.S. patent application entitled "Control Mechanism For Electric Vehicle" bearing attorney docket No. 58,339, and filed on the same date herewith;

U.S. patent application entitled "Improved EMI Filter Topology For Power Inverters" bearing attorney docket No. 58,340, and filed on the same date herewith;

U.S. patent application entitled "Fault Detection Circuit For Sensing Leakage Currents Between Power Source And Chassis" bearing attorney docket No. 58,341, and filed on the same date herewith;

U.S. patent application entitled "Electric Vehicle Relay Assembly" bearing attorney docket No. 58,342, and filed on the same date herewith;

U.S. patent application entitled "Three Phase Power Bridge Assembly" bearing attorney docket No. 58,343, and filed on the same date herewith;

U.S. patent application entitled "Electric Vehicle Propulsion System Power Bridge With Built-In Test" bearing attorney docket No. 58,344, and filed on the same date herewith;

U.S. patent application entitled "Method For Testing A Power Bridge For An Electric Vehicle Propulsion System" bearing attorney docket No. 58,345, and filed on the same date herewith;

U.S. patent application entitled "Electric Vehicle Chassis Controller" bearing attorney docket No. 58,347, and filed on the same date herewith;

U.S. patent application entitled "Electric Vehicle System Control Unit Housing" bearing attorney docket No. 58,348, and filed on the same date herewith;

U.S. patent application entitled "Low Cost Fluid Cooled Housing For Electric Vehicle System Control Unit" bearing attorney docket No. 58,349, and filed on the same date herewith;

U.S. patent application entitled "Electric Vehicle Coolant Pump Assembly" bearing attorney docket No. 58,350, and filed on the same date herewith;

U.S. patent application entitled "Heat Dissipating Transformer Coil" bearing attorney docket No. 58,351, and filed on the same date herewith;

U.S. patent application entitled "Electric Vehicle Battery Charger" bearing attorney docket No. 58,352, and filed on the same date herewith.

1. Background of the Invention
2. Field of the Invention

The present invention relates to an electric vehicle. More particularly, the invention relates to electric vehicle power distribution modules. While the invention is subject to a wide range of applications, it is especially suitable for use in an electric vehicle propulsion system; and will be particularly described in that connection.

DESCRIPTION OF THE RELATED ART

For an electric vehicle to be commercially viable, its cost and performance should be competitive with that of its gasoline-powered counterparts. Typically, the vehicle's propulsion system and battery are the main factors which contribute to the vehicle's cost and performance competitiveness.

Generally, to achieve commercial acceptance, an electric vehicle propulsion system should provide the following features: (1) vehicle performance equivalent to typical gasoline-powered propulsion systems; (2) smooth control of vehicle propulsion; (3) regenerative braking; (4) high efficiency; (5) low cost; (6) self-cooling; (7) electromagnetic interference (EMI) containment; (8) fault detection and self-protection; (9) self-test and diagnostics capability; (10) control and status interfaces with external systems; (11) safe operation and maintenance; (12) flexible battery charging capability; and (13) auxiliary 12 volt power from the main battery. In prior practice, however, electric vehicle propulsion system design consisted largely of matching a motor and controller with a set of vehicle performance goals, such that performance was often sacrificed to permit a practical motor and controller design. Further, little attention was given to the foregoing features that enhance commercial acceptance.

For example, an electric vehicle must provide a fused distribution point for the voltage supplied by the battery pack. The distribution point must distribute power and limit current to various vehicle accessories and system controls. To be commercially viable, the design of the distribution point should minimize weight, number of parts, assembly time, and cost. Most importantly, the distribution point should ensure safe operation and maintenance. All high voltage areas must be safely isolated from human contact.

SUMMARY OF THE INVENTION

Accordingly, the present invention is directed to an electrical vehicle power distribution module that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof, as well as the appended drawings.

To achieve these and other advantages and in accordance with the purpose of the invention, as embodied and broadly described herein, the invention provides an electric vehicle power distribution assembly including a chassis containing a first electrical component group. The assembly further includes a second electrical component group external to the chassis and electrically connected to the first electrical component group. A cover defines an opening therein for containing and preventing access to the second electrical component group. A battery connector is disposed on the chassis for selectively engaging an electric cable from a battery. The assembly further includes means for precluding removal of the cover prior to disengaging the cable from the battery connector.

In another aspect of the present invention, there is provided an electric vehicle power distribution assembly including a chassis containing an electrical component group. A battery connector is disposed on the chassis for electrically connecting the electrical component group to a battery. The assembly further includes a safety cover secured to the chassis. The safety cover has means for defining a hole therethrough for receiving an electric cable from the battery to be selectively engaged with the battery connector. The hole is positioned with respect to the battery connector so as to preclude removal of the safety cover from the chassis without disengagement of the electric cable from the battery connector.

It is to be understood that the foregoing general description and the following detailed description are exemplary and explanatory and are intended to provide further explanation of the invention as claimed.

DESCRIPTION OF THE DRAWINGS

The accompanying drawings are included to provide a further understanding of the invention and are incorporated in and constitute a part of this specification, illustrate a preferred embodiment of the invention, and, together with a description, serve to explain the principles of the invention.

DESCRIPTION OF THE PREFERRED EMBODIMENT

Figure 1:
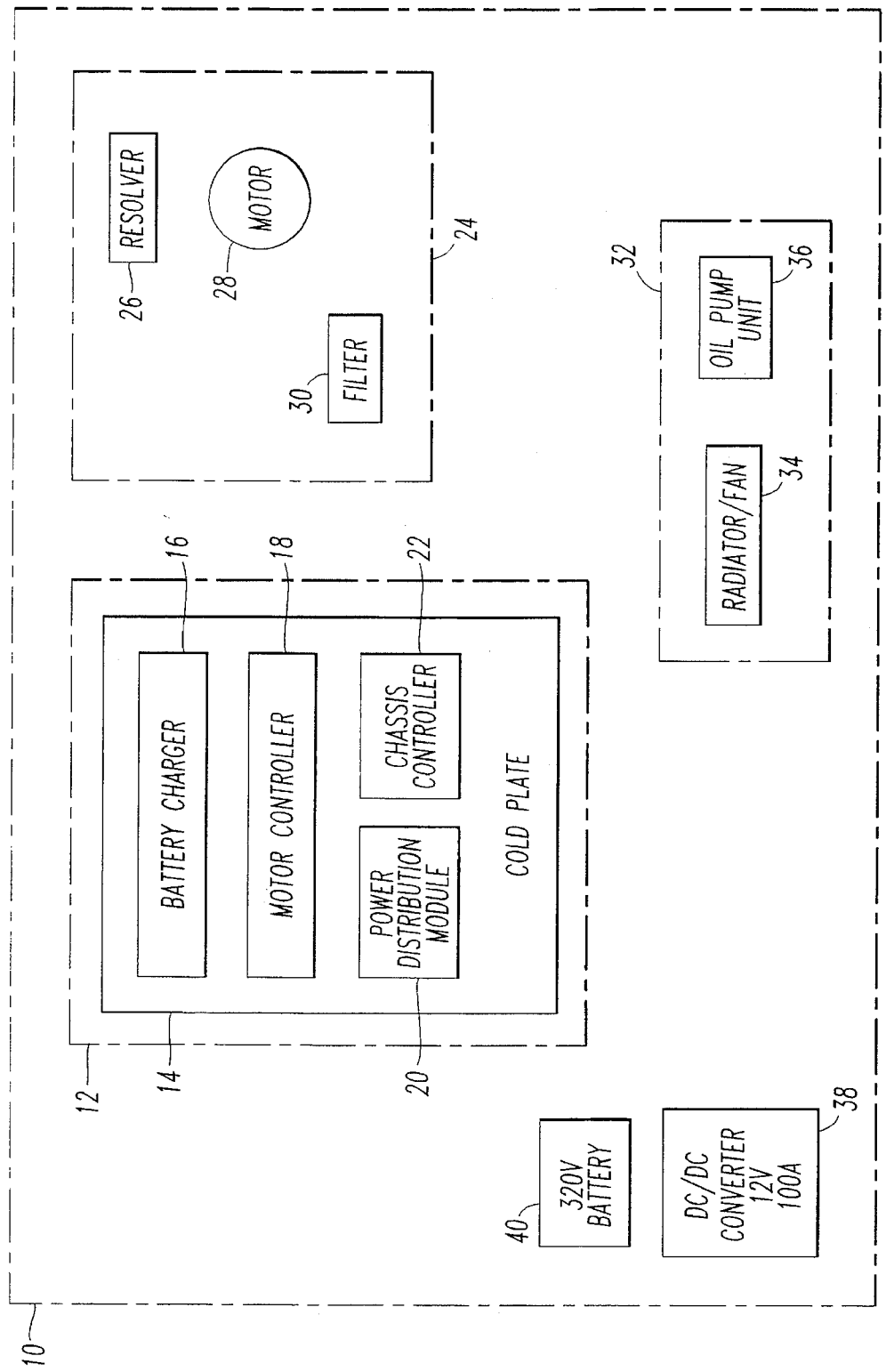
FIG. 1 is a block diagram of an electric vehicle propulsion system in which the electric vehicle power distribution module according to the present invention is used.

Reference will be made in detail to the present preferred embodiment of the invention, examples of which are illustrated in the accompanying drawings. Like reference numerals refer to like parts in the various Figures of the drawings.

The present invention, which relates to a power distribution module, will be discussed with respect to an electric vehicle propulsion system 10 as shown in FIG. 1. The electric vehicle propulsion system 10 comprises a system control unit 12, a motor assembly 24, a cooling system 32, a battery 40, and a DC/DC converter 38. The motor assembly 24 includes a resolver 26, a motor 28, and a filter 30. The cooling system 32 includes an oil pump unit 34 which pumps coolant through a hollow cold plate 14, the motor 28 and a radiator/fan 36. The system control unit 12 includes the cold plate 14. Heat-generating electrical components including a battery charger 16, motor controller 18, power distribution module 20, and chassis controller 22 are mounted in thermal contact with the cold plate 14.

Figure 2:
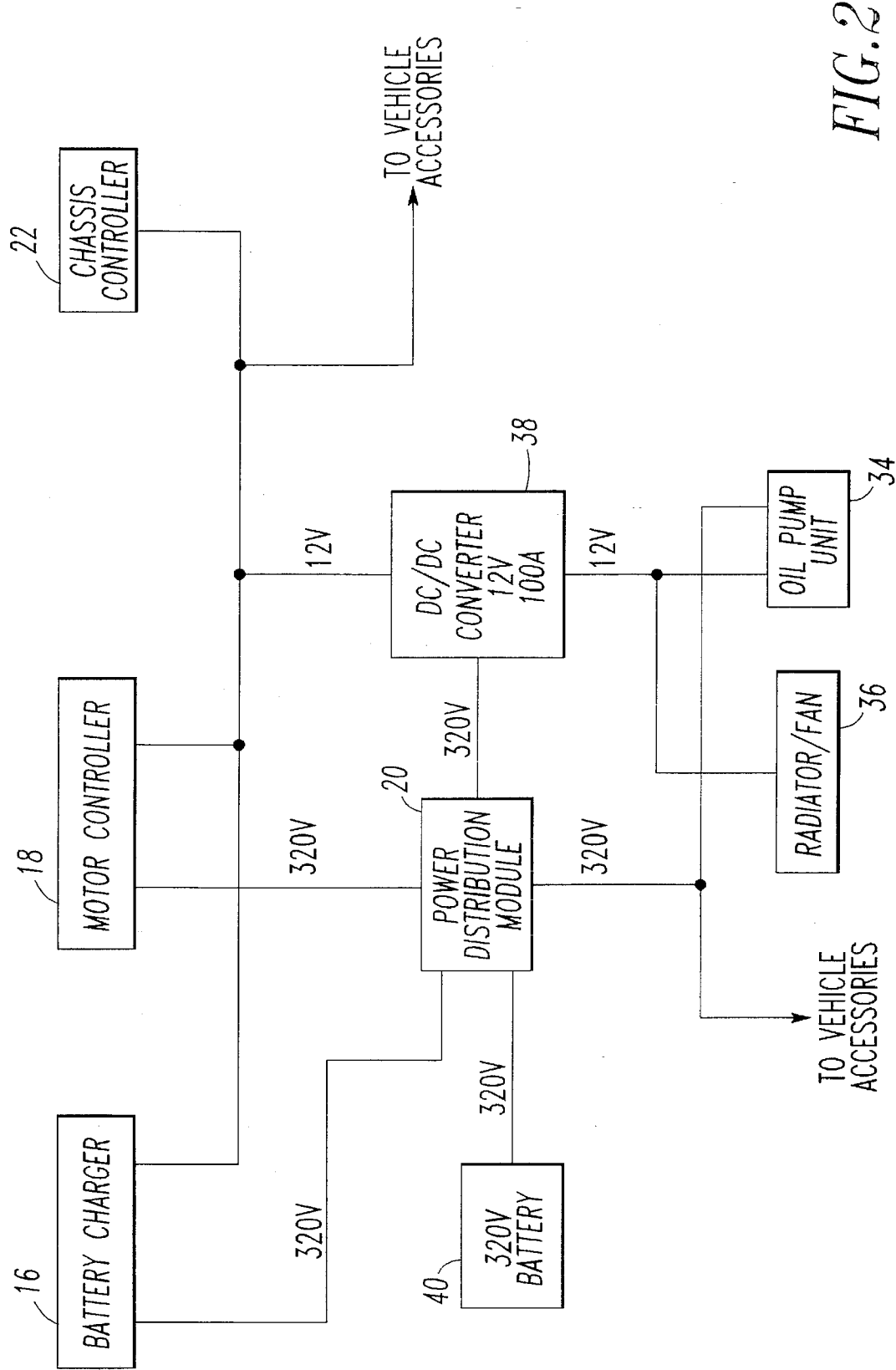
FIG. 2 is a power distribution diagram of the electric vehicle propulsion system of FIG. 1.

FIG. 2 is a power distribution diagram of the electric vehicle propulsion system 10. As shown in FIG. 2, the battery 40 serves as the primary source of power for the electric propulsion system 10. The battery 10 comprises, for example, a sealed lead acid battery, a monopolar lithium metal sulfide battery, a bi-polar lithium metal sulfide battery, or the like, for providing a 320 volt output. Preferably, the electric vehicle propulsion system 10 works over a wide voltage range, e.g., 120 volts to 400 volts, to accommodate changes in the output voltage of the battery 40 due to load or depth of discharge. However, the electric vehicle propulsion system 10 is preferably optimized for nominal battery voltages of about 320 volts.

The power distribution module 20 is coupled to the output of the battery 40 and includes, among other things, fuses, wiring, and connectors for distributing the 320 volt output from the battery 40 to various components of the electric vehicle propulsion system 10. For example, as shown in FIG. 2, the power distribution module 20 distributes the 320 volt output from the battery 40 to the motor controller 18, the DC/DC converter 38, the radiator/fan 36, the oil pump unit 34, and the battery charger 16. The power distribution module 20 also distributes the 320 volt output from the battery 40 to various vehicle accessories, which are external to the electric vehicle propulsion system 10. These vehicle accessories include, for example, an air conditioning system, a heating system, a power steering system, and any other accessories that may require a 320 volt power supply. An embodiment of the power distribution module 20 according to the present invention will be described in more detail herein.

Figure 3:
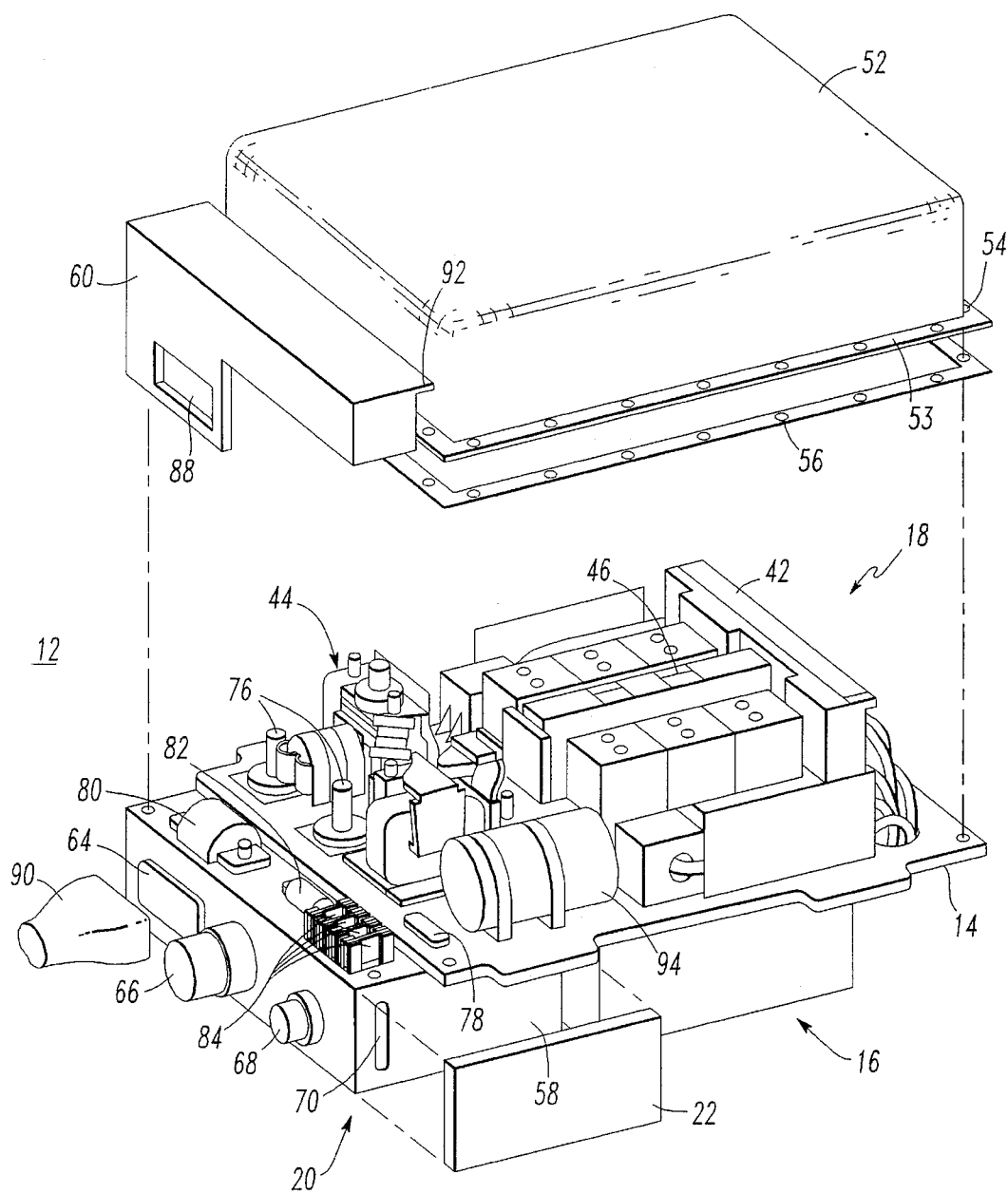
FIG. 3 is an exploded perspective view of a system control unit, according to an embodiment of the present invention, for use in the electric vehicle propulsion system of FIG. 1.

FIG. 3 shows the system control unit 12 of the electric vehicle propulsion system 10, according to an embodiment of the present invention. The unit 12 includes the cold plate 14 on which the battery charger 16, motor controller 18, power distribution module 20, and chassis controller 22 are mounted. The cold plate 14 is a hollow body having a double sided surface on which these electrical components are mounted. In operation, a coolant, typically aircraft turbine oil, passes through the hollow portion of the cold plate 14 to cool the mounted components.

The battery charger 16 receives command signals from and sends status signals to the motor controller 18 for charging the battery 40. The battery charger 16 provides a controlled battery charging current from an external AC power source (not shown). Preferably, AC current is drawn from the external source at near-unity power factor and low harmonic distortion in compliance with expected future power quality standards. Further, the battery charger 16 is preferably designed to be compatible with standard ground fault current interrupters and single-phase power normally found at residential locations.

Both the chassis controller 22 and the motor controller 18 receive signals from a vehicle communication bus. Generally, the vehicle communication bus serves as a communication pathway for interfacing various vehicle sensors and controllers to the chassis controller 22 and the motor controller 18.

The chassis controller 22 comprises a microprocessor-based digital and analog electronics system and provides control and status interfacing to the vehicle's sensors and controllers and to the motor controller 18. For example, the chassis controller 22 is connected, via the vehicle communication bus, to the vehicle key switch, accelerator, brake, and drive selector switches. The chassis controller 22 interprets signals from these switches to provide the motor controller 18 with start-up, drive mode (e.g., forward, reverse, and neutral), motor torque, regenerative braking, shutdown, and built-in test (BIT) commands. Preferably, the chassis controller 22 communicates with the motor controller 18 via an opto-coupled serial data interface and receives status signals from the motor controller 18 of all the commands sent to verify the communication links between the chassis controller 22, the vehicle, and the motor controller 18 and to verify that the vehicle is operating properly. It should be appreciated that because the chassis controller 22 provides the control and status interfacing to the vehicle's sensors and controllers and to the motor controller 18, the electric vehicle propulsion system 10 can be modified for use with any number of different vehicles simply by modifying the chassis controller 22 for a particular vehicle.

The chassis controller 22 also provides battery management capabilities by using signals received over the vehicle communication bus from a battery current sensor located in the power distribution module 20. The chassis controller 22 interprets signals from the current battery sensor, provides charging commands to the motor controller 18, and sends a state-of-charge value to a "fuel" gage on the vehicle dashboard. The chassis controller 22 further connects, via the vehicle communication bus, to vehicle controllers including odometer, speedometer, lighting, diagnostic and emissions controllers, as well as to an RS-232 interface for system development.

Figure 4:
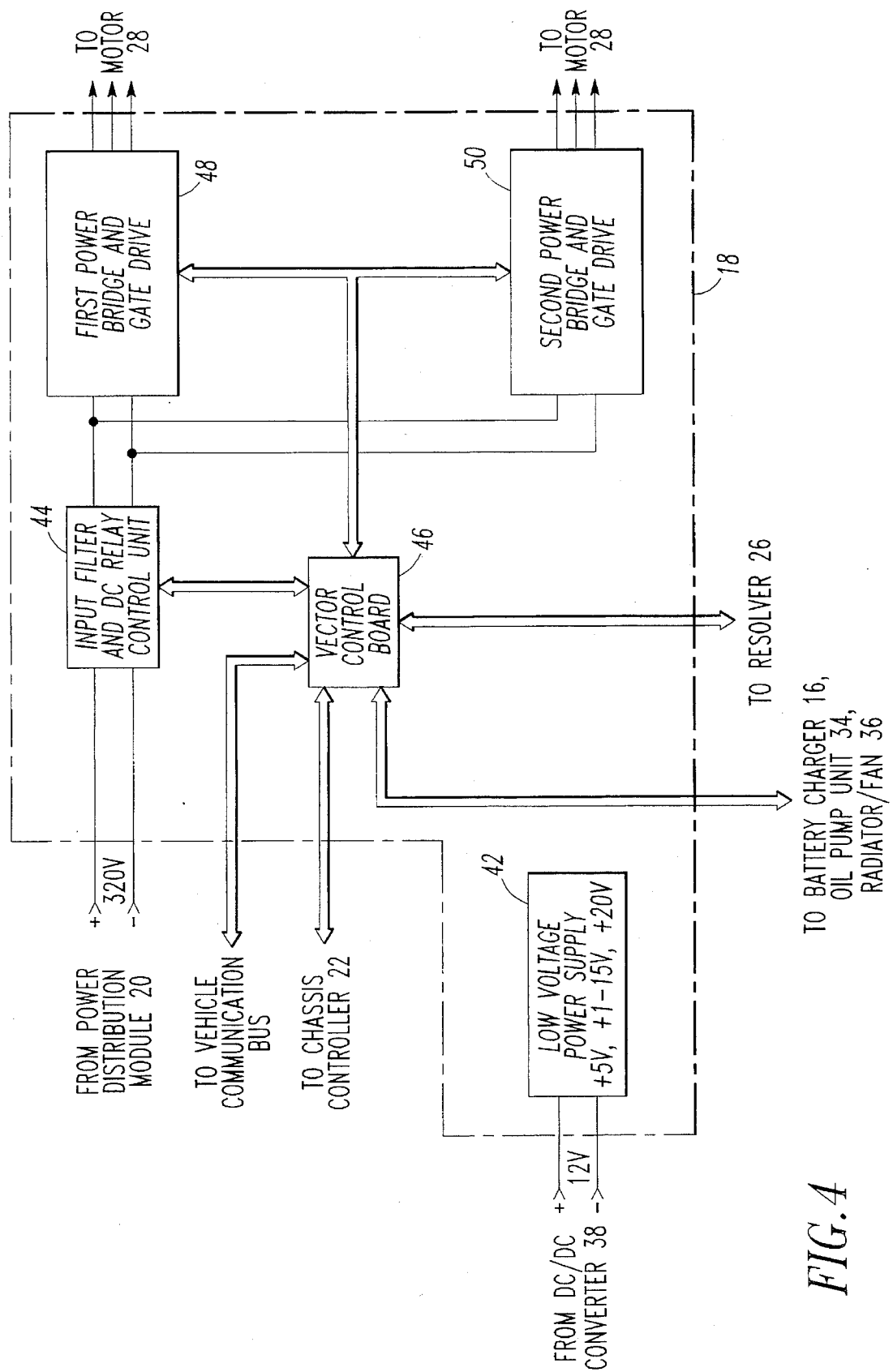
FIG. 4 is a functional diagram of the motor controller of the electric vehicle propulsion system of FIG. 1.

As shown in FIG. 4, the motor controller 18 includes a low voltage power supply 42, an input filter and DC relay control unit 44, a vector control board 46, and first and second power bridges 48 and 50, respectively.

The low voltage power supply 42 converts the 12 volt output from the DC/DC converter 38 to provide +5 V, ±15 V, and +20 V outputs to the input filter and DC relay control unit 44, the vector control board 46, the first power bridge 48, and the second power bridge 50. The low voltage power supply 42 can comprise a commercially available power supply as is known in the art.

The input filter and DC relay control unit 44 includes electrical connections for coupling the 320 volt output of the power distribution module 20 to the first and second power bridges 48 and 50, respectively. The input filter and DC relay control unit 44 includes EMI filtering, a relay circuit for disconnecting the coupling of the 320 volt output of the power distribution module 20 to the first and second power bridges 48 and 50, respectively, and various BIT circuits including voltage sense circuits and a chassis ground fault circuit. Preferably, the input filter and DC relay control unit 44 receives control signals from and sends status signals, e.g., BIT signals, to the vector control board 46.

Each of the first and second power bridges 48 and 50, respectively, includes insulated gate bipolar transistor (IGBT) switching circuits and associated gate drive circuits for applying drive currents to each of the windings of the motor 28. Preferably, each of the first and second power bridges 48 and 50, respectively, provides half the current to the windings of the motor 28, thereby allowing the use of readily available, low cost IGBT switching circuits. The first and second power bridges 48 and 50, respectively, receive control signals from and send status signals, e.g., BIT signals, to the vector control board 46.

The vector control board 46 comprises a microprocessor based digital and analog electronics system. As its primary function, the vector control board 46 receives driver-initiated acceleration and braking requests from the chassis controller 22. The vector control board 46 then acquires rotor position measurements from the resolver 26 and current measurements from the first and second power bridges 48 and 50, respectively, and uses these measurements to generate pulse width modulated (PWM) voltage waveforms for driving the first and second power bridges 48 and 50, respectively, to produce the desired acceleration or braking effects in the motor 28. The PWM voltage waveforms are generated in accordance with a control program which is designed to result in a requested torque output. As described above, the vector control board 46 also has the function of controlling the input filter and DC relay control unit 44, the oil pump unit 34, the radiator/fan 36, the battery charger 16, the input filter and DC relay control unit 44, built in test circuitry, vehicle communication, and fault detection.

As shown in FIG. 3, a cover 52 mounts onto the cold plate 14 to cover and prevent access to the motor controller 18. The cover 52 includes a cover flange 53 around its opening to form an interface between the cover 52 and the cold plate 14. The cover 52 is preferably secured to the cold plate 14 via a plurality of screws 54. An electro-magnetic interface (EMI) gasket 56 is affixed between the cover flange 53 and the cold plate 14 to reduce radiation of electro-magnetic energy through the cover/cold plate interface.

Figure 5:
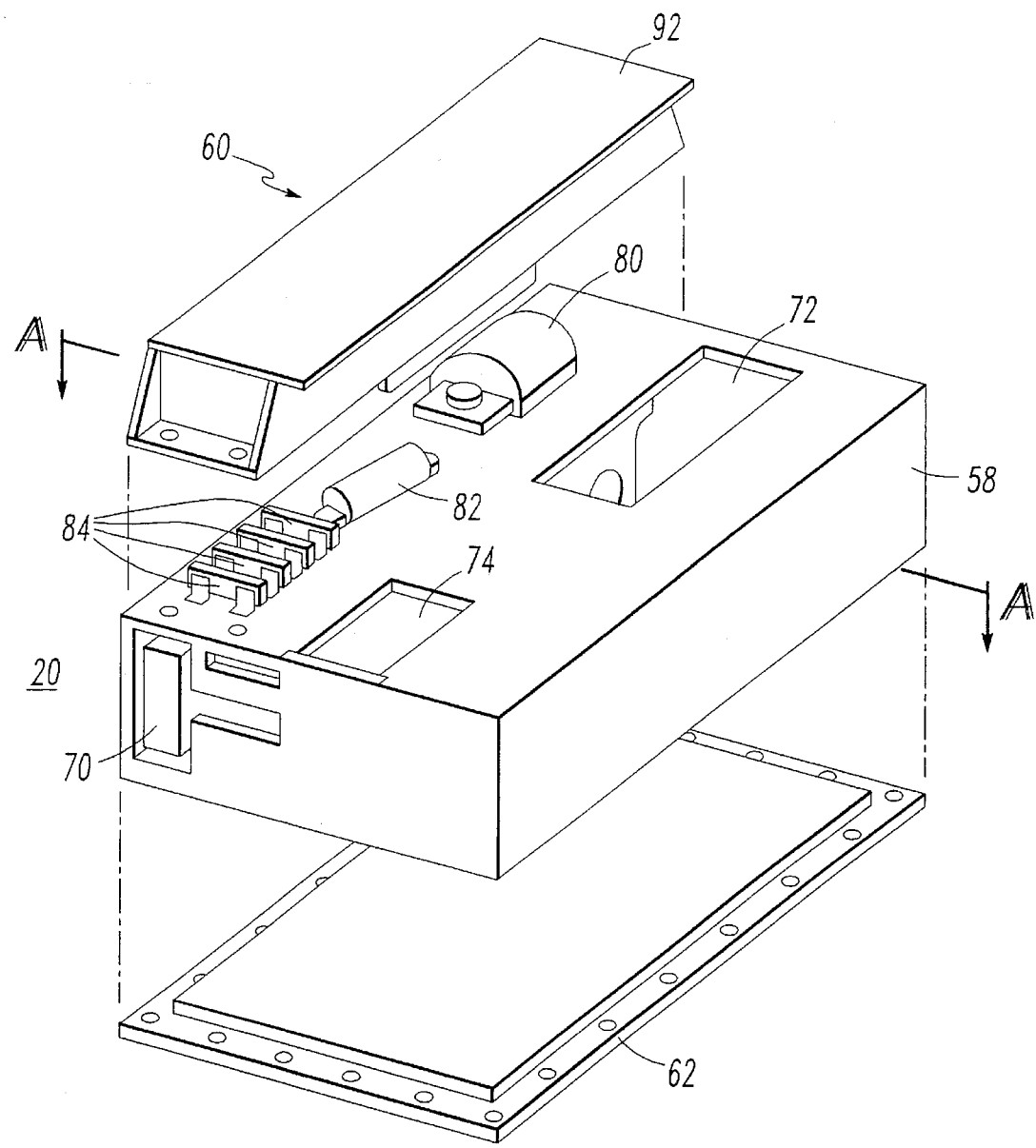
FIG. 5 is an exploded perspective view of the power distribution module of the system control unit shown in FIG. 3.

FIG. 5 shows the power distribution module 20 utilized in the system control unit 12 of FIG. 3, according to an embodiment of the present invention. The power distribution module 20 includes a chassis 58, a safety cover 60, and a bottom 62, all preferably comprised of an electrically non-conductive plastic. As shown most clearly in FIG. 3, a battery connector 64, power distribution connector 66, vehicle communication bus connector 68, and chassis controller connector 70 (preferably, a 78 pin connector) are mounted on the sides of the chassis 58. The chassis controller 22 attaches to the power distribution module 20 preferably by screws and electrically connects to the chassis controller connector 70. The battery 40 is electrically connected to the battery connector 64 by an electric cable 90 (FIG. 3) from the battery 40.

As shown in FIG. 5, mounted on top of the chassis 58 are a plurality of molded plastic fuse holders and fuses. Preferably, the fuses include a 400 amp motor controller fuse 80, a 50 amp heater fuse 82, and four smaller vehicle accessory fuses 84 (a 30 amp power steering fuse, a 30 amp air conditioning fuse, a 20 amp DC/DC converter fuse, and a 10 amp oil pump unit fuse). As shown in FIG. 5, the top of the chassis further includes mating points 72 and 74 for, respectively, feed-through capacitors 76 and a filter pin connector 78 (preferably, a 37 pin connector) of the motor controller 18. A current sensor 86 (FIG. 7) and a small signal cable harness for the low voltage signals are contained within the chassis 58. Preferably, the current sensor has a range from 0 to ±500 amps and an output from 0 to ±10 volts.

Figure 6:
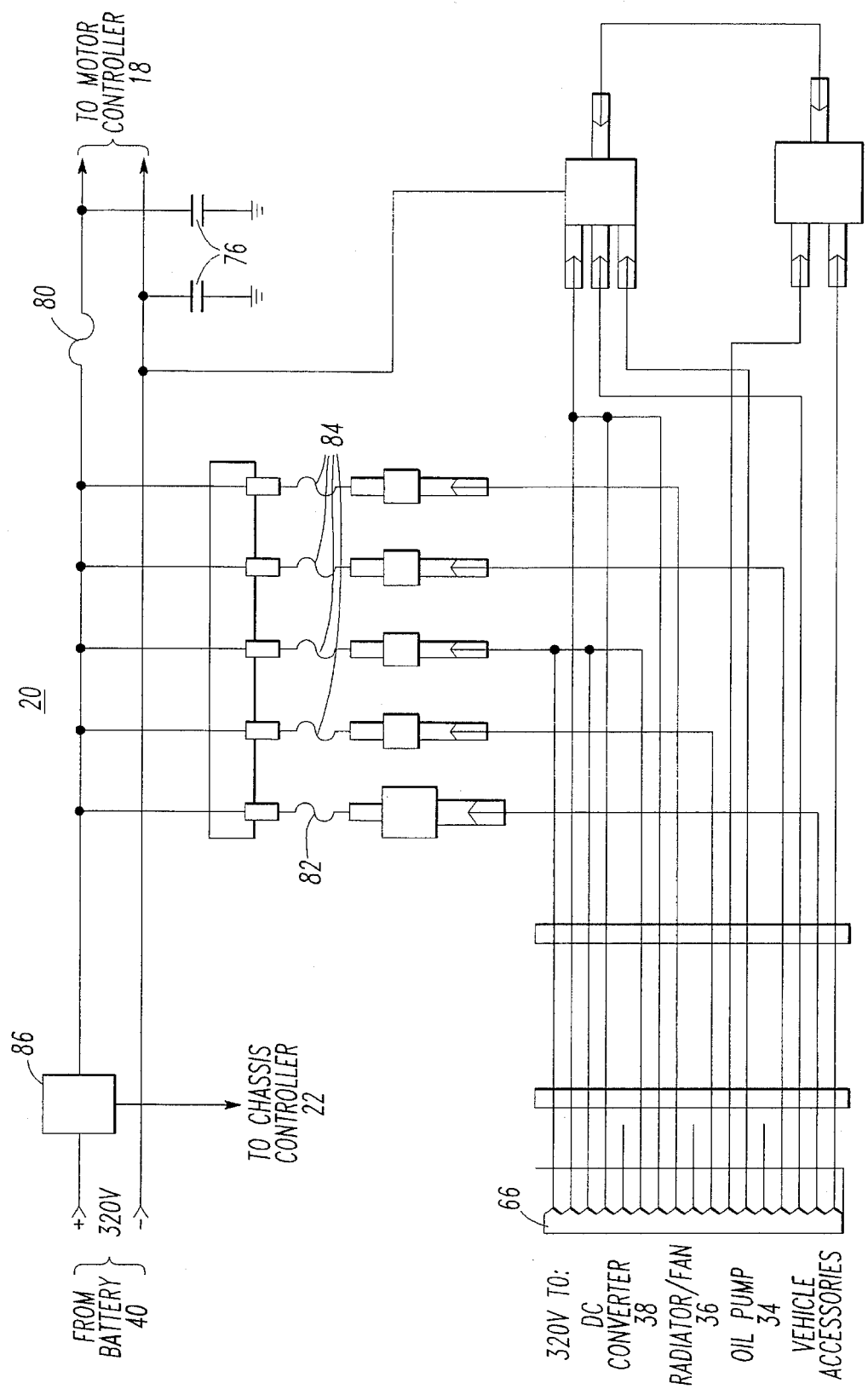
FIG. 6 is an electrical diagram of the power distribution module of FIG. 5.

FIG. 6 is an electrical diagram of the power distribution module 20. Power from the battery 40 enters the battery connector 64 and is routed through the current sensor 86 to the fuses 80, 82, and 84. The current sensor 86 measures the current out of the battery 40 and sends signals to the chassis controller 22, which interprets the signals, provides charging commands to the motor controller 18, and sends a state-of-charge value to a "fuel" gage on the vehicle dashboard.

The fused battery voltage from the 400 amp motor controller fuse 80 is electrically connected to two feed-through capacitors 76 of the motor controller 18. The power for the motor controller passes through the capacitors 76, which also provide EMI isolation. The fused battery voltage from the fuses 82 and 84 is routed to the power distribution connector 66. This 320 volt output is then distributed to various components of the electric vehicle propulsion system 10, namely, the DC/DC converter 38, radiator/fan 36, and oil pump unit 34, as well as various accessories external to the propulsion system 10, for example, the air conditioning system, heating system, and power steering system. The DC/DC converter converts the 320 volt battery output to 12 volts and supplies the 12 volt output as operating power to the battery charger 16, the motor controller 18, the chassis controller 22, and various other vehicle accessories, for example, vehicle lighting, an audio system, and any other accessories that may require a 12 volt power supply.

The cable harness within the chassis 58 consists of wiring to electrically connect the current sensor 86, the vehicle communication bus connector 68, the chassis controller 22 via the chassis controller connector 70, and the motor controller 18 via the filter pin connector 78. The cable harness does not provide a power distribution function but rather is an interface for the control and status signals between the chassis controller 22, motor controller 18, current sensor 86, and the vehicle.

Figure 7:
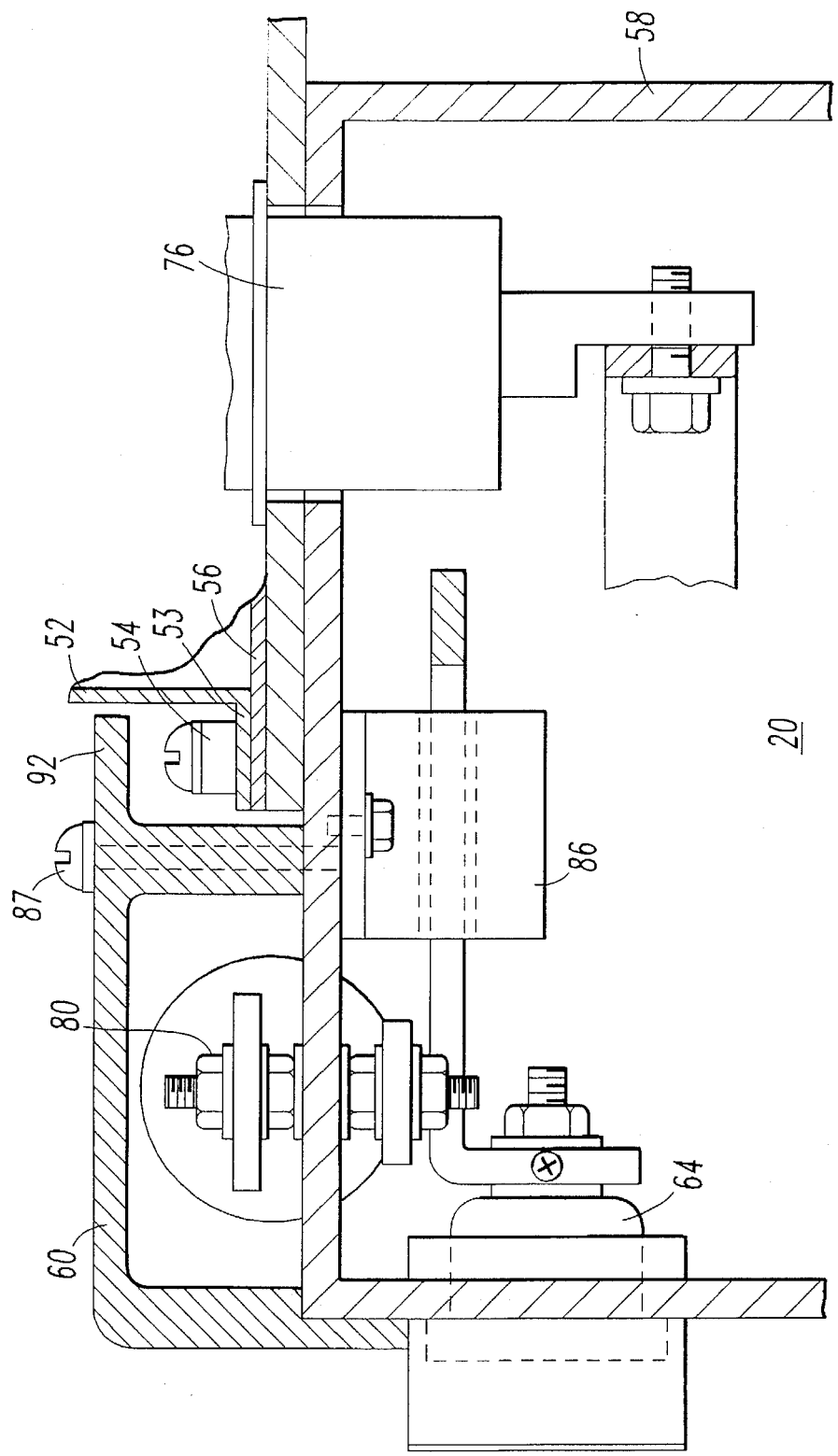
FIG. 7 is a partial cross-sectional view taken on line A—A of the power distribution module of FIG. 5.

The power distribution module 20, mainly through the design of the safety cover 60, incorporates several safety features. The safety cover 60 preferably mounts onto the chassis 58 with a pair of screws 87, as shown in FIG. 7. The safety cover 60 covers the fuses 80, 82, and 84, in order to safely isolate them from human contact during operation. As shown in FIG. 3, the safety cover 60 includes a hole or aperture 88 therethrough for receiving the electric cable 90 from the battery 40. The electric cable 90 selectively engages with the battery connector 64. In order to remove the safety cover 60 from the chassis 58, the electric cable 90 must first be disengaged from the battery connector 64. Thus, to perform service on the fuses 80, 82, or 84, the power supply from the battery 40 to the fuses must be disconnected, ensuring safe replacement or service of the fuses.

As shown most clearly in FIG. 7, the safety cover 60 further includes an interlock flange 92. When the safety cover 60 is mounted onto the chassis 58, the interlock flange 92 covers a portion of the cover flange 53 and mounting screws 54 of the motor controller cover 52. In order to remove the motor controller cover 52, the safety cover 60 must first be removed, and, therefore, the electric cable 90 must be disengaged. Disengagement of the electric cable 90 cuts off the power supply to the feed-through capacitors 76 of the motor controller 18.

Figure 8:
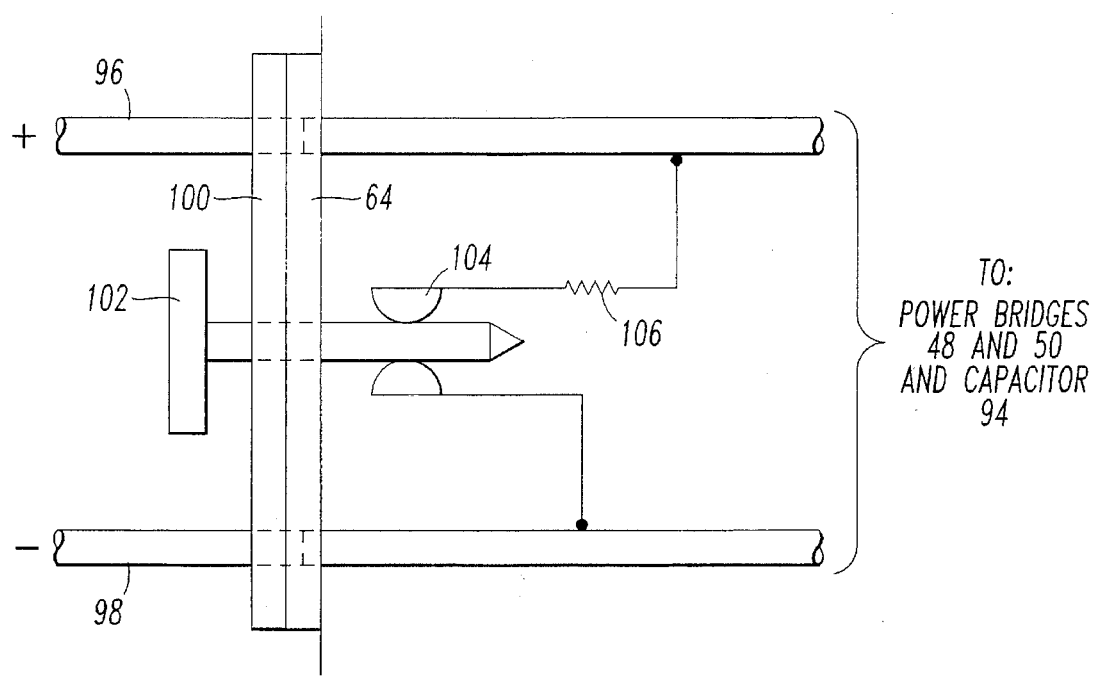
FIG. 8 is a diagram illustrating a plunger used in a preferred embodiment of the power distribution module according to the present invention.

In addition, the present invention includes a capacitor in the motor controller 18 and means for discharging the capacitor upon disengagement of the battery cable from the battery connector. According to an embodiment of the present invention and as illustrated in FIG. 8, the electric cable 90, which is represented by + and − cables 96 and 98 respectively, engages a plunger 100 which connects to the battery connector 64. The plunger 100 passively causes the feed-through capacitors 76 and an electrolytic capacitor 94 (FIG. 3) of the motor controller 18 to discharge when the plunger 100 is disengaged from the battery connector 64. The plunger 100 includes a T-handle 102 that is inserted between contacts 104 of the discharge circuit of the input filter and DC relay control unit 44. The T-handle 102 is sufficiently long so that, when the electric cable 90 is disengaged from the battery connector 64, the contacts 104 will not initially mate. The high voltage connection between the cable 90 and the battery connector 64 breaks prior to the mating of the contacts 104. Once the T-handle 102 is sufficiently pulled through the battery connector 64, the contacts 104 will mate, causing high impedance (resistor 106) to be inserted in series with the electrolytic capacitor 94 to dissipate the stored energy in the capacitor 94. These safety features ensure that high voltage power supply to the motor controller 18 is disconnected prior to service of the motor controller 18.

In addition, because the power distribution module 20 has no EMI limitations, the chassis 58, safety cover 60, and bottom 62 are comprised of a material, preferably a non-conductive plastic, to further reduce the risk of electric shock during operation.

It will be apparent to those skilled in the art that various modifications and variations can be made in the electric vehicle power distribution module of the present invention without departing from the spirit or scope of the invention. Thus, it is intended that the present invention cover the modifications and variations of this invention provided they come within the scope of the appended claims and their equivalents.

We claim:

1. An electrical vehicle power distribution assembly comprising:

a power distribution chassis containing a first electrical component group;

a second electrical component group external to said power distribution chassis and electrically connected to the first electrical component group;

first cover means for preventing access to the second electrical component group;

a battery connector disposed on said power distribution chassis for selectively engaging an electric cable from a battery; and second cover means for preventing access to the first electrical component group and including means for precluding removal of the first cover means prior to disengaging the electric cable from the battery connector when said electric cable and said battery connector are engaged.

2. The electric vehicle power distribution assembly according to claim 1, wherein said second cover means comprises a safety cover removably secured to the power distribution chassis.

3. The electric vehicle power distribution assembly according to claim 2, wherein the safety cover includes a hole therethrough for receiving the electric cable, the hole being positioned with respect to the battery connector so as to preclude removal of the safety cover from the power distribution chassis without a prior disengagement of the electric cable from the battery connector.

4. The electric vehicle power distribution assembly according to claim 3, further including at least one fuse disposed on the power distribution chassis and electrically connected to the battery connector, and wherein the safety cover covers said at least one fuse.

5. The electric vehicle power distribution assembly according to claim 2, wherein the power distribution chassis and the second electrical component group are mounted on a cold plate and wherein said first cover means is secured to the cold plate.

6. The electric vehicle power distribution assembly according to claim 5, wherein the first cover means comprises a cover including a peripheral flange secured to the cold plate to form an interface between the first cover means and the cold plate.

7. The electric vehicle power distribution assembly according to claim 6, wherein the safety cover includes an an overhanging flange covering a portion of the peripheral flange of said first cover means to preclude removal of said first cover means prior to removal of said safety cover.

8. The electric vehicle power distribution assembly according to claim 1, wherein the second electrical component group includes at least one capacitor electrically connected to the battery connector, and further comprising means in said first electrical component group for discharging said at least one capacitor upon disengagement of the electric cable.

9. The electric vehicle power distribution assembly according to claim 2, wherein the safety cover and the power distribution chassis are formed of electrically non-conductive material.

10. The electric vehicle power distribution assembly according to claim 1, wherein the first electrical component group comprises components for distributing power from a battery to preselected portions of an electric vehicle.

11. The electric vehicle power distribution assembly according to claim 1, wherein the second electrical component group comprises components for controlling a motor of an electric vehicle.

12. An electric vehicle power distribution assembly comprising:

a chassis containing a power distribution component group;

a battery connector mounted on the chassis for electrically connecting the power distribution component group to a battery; and a safety cover secured to the chassis, the safety cover including an aperture therethrough for receiving an electric cable from the battery and which engages the battery connector, the aperture being located in a wall of the safety cover so as to preclude removal of the safety cover from the chassis without a prior disengagement of the electric cable from the battery connector when said electric cable engages the battery connector;

a motor controller component group, for powering an electric vehicle, external to said chassis and being electrically connected to the power distribution component group; and a cover for the motor controller component group and wherein the cover for the motor controller component group is precluded from being removed prior to removal of the safety cover.

13. The electric vehicle power distribution assembly according to claim 12, wherein said chassis, the motor controller component group, and the cover for the motor controller component group are mounted on a cold plate.

14. The electric vehicle power distribution assembly according to claim 13, wherein the cover for the motor controller component group includes a peripheral flange and electro-magnetic interface gasket adjacent said flange for forming an EMI interface between the cover and the cold plate, and further including means for securing the cover and the gasket to the cold plate.

15. The electric vehicle power distribution assembly according to claim 14, wherein the safety cover includes an overhanging flange covering a portion of said peripheral flange and said securing means of the cover for the motor controller component group.

16. The electric vehicle power distribution assembly according to claim 13, further including at least one fuse disposed on said chassis and electrically connected to the battery connector, and wherein the safety cover covers said at least one fuse.

17. The electric vehicle power distribution assembly according to claim 13, wherein the safety cover and the chassis are formed of electrically non-conductive material.

18. The electric vehicle power distribution assembly according to claim 12, wherein the motor controller component group includes at least one capacitor electrically connected to the battery connector, and additionally comprising means connected to the battery connector for discharging said at least one capacitor upon disengagement of the electric cable from the battery connector.

* * * * *